United States Patent
Noguchi et al.

(10) Patent No.: US 11,097,969 B2
(45) Date of Patent: Aug. 24, 2021

(54) MEMBRANE SEPARATION METHOD AND DEVICE PROVIDED WITH PARTICLE SORTING DEVICE

(71) Applicant: MEIDENSHA CORPORATION, Tokyo (JP)

(72) Inventors: Hiroshi Noguchi, Singapore (SG); Guihe Tao, Singapore (SG); Terutake Niwa, Singapore (SG); Yasuhiro Fukuzaki, Gifu (JP); Yingjie Lee, Singapore (SG); Jia Ting Yen, Singapore (SG); Seng Chye Chua, Singapore (SG); Bernhard Wett, Innsbruck (AT)

(73) Assignee: MEIDENSHA CORPORATION, Tokyo (JP)

( * ) Notice: Subject to any disclaimer, the term of this patent is extended or adjusted under 35 U.S.C. 154(b) by 53 days.

(21) Appl. No.: 16/473,729

(22) PCT Filed: Mar. 31, 2017

(86) PCT No.: PCT/JP2017/013691
§ 371 (c)(1),
(2) Date: Jun. 26, 2019

(87) PCT Pub. No.: WO2018/123092
PCT Pub. Date: Jul. 5, 2018

(65) Prior Publication Data
US 2020/0407243 A1 Dec. 31, 2020

(30) Foreign Application Priority Data
Dec. 28, 2016 (SG) ............................ 10201610914Y (51) Int. Cl.
*C02F 9/00* (2006.01)
*B01D 61/16* (2006.01)
(Continued)

(52) U.S. Cl.
CPC ................ *C02F 9/00* (2013.01); *B01D 61/16* (2013.01); *B01D 61/18* (2013.01); *B01D 65/02* (2013.01);
(Continued)

(58) Field of Classification Search
CPC ...... C02F 9/00; C02F 1/52; C02F 1/38; C02F 1/444; C02F 1/385; C02F 1/44; C02F 1/441; C02F 1/442
See application file for complete search history.

(56) References Cited

U.S. PATENT DOCUMENTS 7,608,190 B1 * 10/2009 Banerjee .............. B01J 20/0222
                                                        210/663
9,242,882 B2    1/2016 Nyhuis et al.
(Continued)

FOREIGN PATENT DOCUMENTS

CN        103979710 A    8/2014
CN        105980313 A    9/2016
(Continued)

OTHER PUBLICATIONS

Chinese Office Action, Application No. 201780080948.4, dated Feb. 28, 2020, 2 pages.

*Primary Examiner* — David C Mellon
(74) *Attorney, Agent, or Firm* — Foley & Lardner LLP (57) ABSTRACT

Disclosed is an apparatus for water treatment, including a membrane separator for solid-liquid separation; and a particle fractionator which has at least two exits of a fractionated solid-liquid mixture produced therein, wherein a liquor containing particles of different sizes including submicron particles is fed to the particle fractionator before a membrane separation by the membrane separator, and wherein a first fraction of the fractionated solid-liquid mixture is returned to the membrane separator from one exit of the at least two exits of the particle fractionator, the first fraction
(Continued)

being less than the liquor in terms of content of the submicron particles. This apparatus enables a rapid achievement of suppression of membrane fouling.

12 Claims, 4 Drawing Sheets

(51) Int. Cl.
*B01D 61/18* (2006.01)
*B01D 65/02* (2006.01)
*C02F 1/38* (2006.01)
*C02F 1/44* (2006.01)
*C02F 1/52* (2006.01)

(52) U.S. Cl.
CPC .. *B01D 2311/04* (2013.01); *B01D 2311/2642* (2013.01); *B01D 2311/2676* (2013.01); *B01D 2311/2688* (2013.01); *C02F 1/38* (2013.01); *C02F 1/444* (2013.01); *C02F 1/52* (2013.01)

(56) References Cited

U.S. PATENT DOCUMENTS

| | | | |
|---|---|---|---|
| 9,487,425 B1* | 11/2016 | Culler | C02F 1/444 |
| 2005/0051488 A1* | 3/2005 | Nagghappan | B01D 61/12 |
| | | | 210/652 |
| 2006/0000771 A1* | 1/2006 | Gaid | C02F 9/00 |
| | | | 210/616 |
| 2014/0014577 A1* | 1/2014 | Wakahara | C02F 3/286 |
| | | | 210/603 |
| 2014/0144836 A1 | 5/2014 | Nyhuis et al. | |
| 2015/0166385 A1* | 6/2015 | Boerm | B01D 61/08 |
| | | | 210/652 |
| 2016/0102006 A1* | 4/2016 | Blumenschein | C02F 1/04 |
| | | | 210/638 |

FOREIGN PATENT DOCUMENTS

| | | |
|---|---|---|
| JP | 2007-727 A | 1/2007 |
| JP | 2013-237130 A | 11/2013 |
| JP | 2016-504185 A | 2/2016 |

* cited by examiner

MEMBRANE SEPARATION METHOD AND DEVICE PROVIDED WITH PARTICLE SORTING DEVICE

TECHNICAL FIELD

The present invention relates to a method and apparatus for membrane separation to treat raw water for drinking water and various kinds of wastewater such as domestic sewage and industrial wastewater.

BACKGROUND ART

Membrane separation process has been widely used in the field of drinking water and wastewater treatments. For drinking water treatment, coagulants are added to the raw water, and then membrane filtration is applied, to remove contaminants and pathogen such as *Cryptosporidium*.

On the other hand, activated sludge process has been commonly used for wastewater treatment. Wastewater is contacted with activated sludge, and microorganisms in the sludge consume dissolved substances, to purify the wastewater. Activated sludge is separated from treated water by sedimentation or after-treatment. Membrane separation process is applied to an effluent of activated sludge process to remove contaminants and pathogen.

Furthermore, membrane bioreactor (hereinafter, MBR) is widely used in which activated sludge and membrane separation process are combined. In the MBR system, a stable separation of sludge can be achieved regardless of sludge conditions. Furthermore, it also has an advantage of reduction of footprint of the facility.

PRIOR ART PUBLICATION

Patent Publication

Patent Publication 1: U.S. Pat. No. 9,242,882 B2 Specification

SUMMARY OF THE INVENTION

In membrane separation process for drinking water and wastewater treatments, it is an important task to suppress membrane fouling. It becomes impossible to obtain a sufficient amount of treated water, and life time of membrane is reduced by membrane fouling, which results in a higher operation cost. Main components of membrane foulants, for example, in MBR system are believed to be colloidal substances and submicron-particles. Colloidal substances involve metabolic substances released from microorganisms. Release of metabolic substances can be suppressed by maintaining conditions of microorganisms well, but it is difficult to keep conditions when feed water quality is rapidly changed.

Colloidal substances and smaller particles composed of organic and/or inorganic substances can be removed by adding coagulant to MBR system. It results, however, in a higher treatment cost.

Patent Publication 1 describes a possibility of suppression of membrane fouling by removing colloidal substances and smaller particles in sludge by extracting by a gravity separator. This publication, however, does not show proving data for removal rate of colloidal substances and smaller particles when using this gravity separator. Therefore, it is not clear from this publication whether it is necessary to reduce colloidal substances or smaller particles or both of them to suppress membrane fouling.

Furthermore, the publication describes a method to extract sludge from a microorganism treatment process and separate larger particles with superior settling characteristics and return them to the treatment process. It describes that residuals after separating larger particles are rejected or supplied to solid treatment process. In this case, when the amount of extracted sludge is increased, the concentration of microorganisms in the treatment process will be decreased and activity of the process will be reduced. This also results in decrease of production rate of treated water obtained by membrane separation and in decrease of recovery rate. Furthermore, it takes a long period of time to achieve suppression of membrane fouling with the method of this publication, because the rate of sludge extraction is limited in order to retain concentration of sludge in a biological treatment process.

It is therefore an object of the present invention to effectively suppress membrane fouling in a membrane separation process.

The present invention provides a device equipped with a particle fractionator, which selectively removes submicron-particles from water to suppress membrane fouling.

Analysis of membrane foulants in a membrane separation device was carried out in detail, and it was revealed that membrane fouling can effectively be suppressed by discharging submicron-particles to the outside of the system and retaining larger particles in the system even without removing colloidal substances from water, in the membrane separation device.

According to one aspect of the present invention, there is provided an apparatus for water treatment, including a membrane separator for solid-liquid separation; and a particle fractionator which has at least two exits of a fractionated solid-liquid mixture produced therein, wherein a liquor containing particles of different sizes including submicron particles is fed to the particle fractionator before a membrane separation by the membrane separator, and wherein a first fraction of the fractionated solid-liquid mixture is returned to the membrane separator from one exit of the at least two exits of the particle fractionator, the first fraction being less than the liquor in terms of content or proportion of the submicron particles.

The present invention mentioned above enables to minimize the amount of reject water with removal of submicron particles and, to obtain the membrane fouling suppression effect by returning larger particles and residual water to a membrane separation device, after selectively removing submicron-particles from the membrane separation device. This results in increase of production rate of the membrane filtered water in the membrane separation device.

Furthermore, the present invention enables to minimize the amount of reject water, even if increasing the amount of water drawn from membrane separation process to the particle fractionator. Therefore, increase in the amount of water drawn from the membrane separation device results in increase in removal rate of sub-micron particles in the membrane separation device. This enables a rapid suppression of membrane fouling.

Although Examples which will be shown below are examples for MBR system, the present invention can be applied to not only MBR system but also any membrane separation system to treat water containing a particulate component containing sub-micron particles and larger particles and foulants such as colloidal substances.

Advantageous Effect of the Invention

The present invention enables to obtain the membrane fouling suppression effect while minimizing the amount of reject water by returning larger particles and residual water to membrane separation process, after removing submicron-particles from the treatment water from membrane separation process. This results in increase of production of the membrane filtered water by the membrane separation and in increase of recovery rate.

Furthermore, according to the present invention, even if increasing the amount of water that is drawn from membrane separation process and then is fed to the particle fractionator, it is possible to increase the amount of water returned to the membrane separation process. Therefore, it is possible to minimize the amount of reject water. This enables a rapid removal of sub-micron particles from membrane separation process and a rapid achievement of suppression of membrane fouling.

MODE FOR IMPLEMENTING THE INVENTION

Detail of the present invention will be described with explanation of Examples below.

Figure 1:
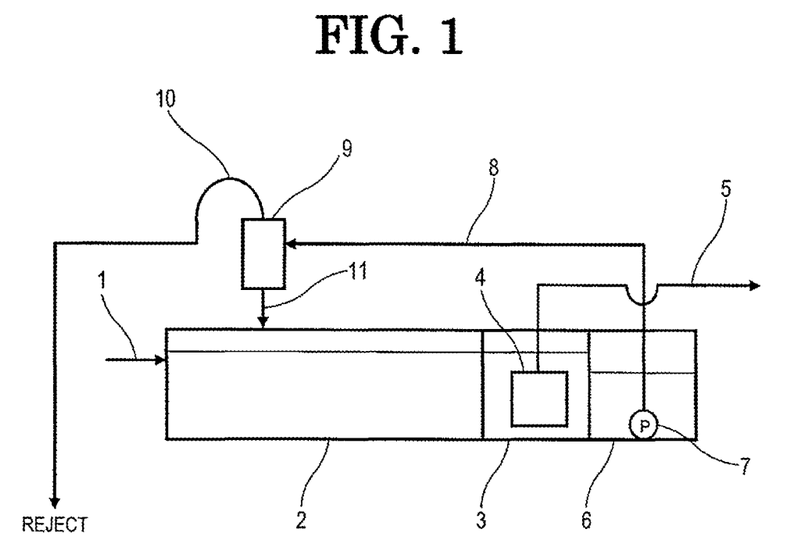
FIG. 1 is a schematic diagram for Example 1 of the present invention.

FIG. 1 shows a treatment flow of a water treatment apparatus equipped with a particle fractionator 9 which selectively removes submicron-particles in water according to Example 1. The water treatment apparatus of the present example is equipped with the particle fractionator 9 and a membrane separation device. The membrane separation device includes the reaction tank 2, membrane separation tank 3 and recirculation tank 6.

Influent 1 is supplied to a reaction tank 2 as a pretreatment apparatus, and then goes to a membrane separation tank 3. In the reaction tank 2, a biological treatment process using activated sludge is used for Example 1. Treatment process for the reactor 2 can be selected from biological treatment process using activated sludge, physical-chemical treatment process such as coagulation process, oxidation treatment process such as ozonation, combination of these processes, or other processes required for pretreatment before membrane filtration process.

Production water 5 is produced as a permeate from a membrane module 4 in the membrane separation tank 3. Production water 5 is applied to a necessary post treatment and is used as drinking water for water treatment system. Production water 5 is applied to post treatment, if necessary, and reused as reclaimed water or discharged as treated water in treatment for domestic sewage and industrial wastewater.

One using UF membrane (ultrafiltration membrane) with a nominal pore size of 0.04 μm is cited as separation membrane module 4 to be used in the membrane separation tank 3. MF membrane (microfiltration membrane), UF membrane, NF membrane (nanofiltration membrane) or a combination of these membranes can be used as separation membrane module 4. Both types of submerged-type and pressurized-type can be used as separation membrane module 4. When a pressurized-type module is used, a system made by combining a plurality of modules is used instead of membrane separation tank 3.

Unfiltered water in membrane separation tank 3 is supplied to the return tank 6, and draw water 8 from the recirculation tank 6 is fed to a particle fractionator 9 by using a pump 7 in the return tank 6. Draw water 8 may be directly taken from the membrane separation tank 3 without using the recirculation tank 6. Draw water 8 can be also taken from the reaction tank 2 when a recirculation flow line is applied between the reaction tank 2 and the membrane separation tank 3.

Sub-micron particles in draw water 8 are fractionated into first fraction 10 by the particle fractionator 9. Residual particles after fractionating sub-micron particles are contained in second fraction 11. The second fraction 11 contains larger particles. It is not necessary to fractionate sub-micron particles completely into the first fraction 10, and the second fraction 11 can contain both larger particles and sub-micron particles. The first fraction 10 is rejected from the membrane separation device. The second fraction 11 is return to the reaction tank 2.

The concentration of sub-micron particles in the membrane separation device can be reduced by removing sub-micron particles in the first fraction 10. Consequently, larger particles can be retained in the membrane separation device.

Hydrocyclone was used as the particle fractionator in validation test for Example 1. As the hydrocyclone of the present invention, a known one described in Patent Publication 1 or a modified one thereof can be used. Herein, the particle fractionator is a device for conducting particle fractionation by wet classification. Its method is classified into gravitational classification using the sedimentation speed difference of particles, centrifugal classification using the sedimentation speed difference in centrifugal field, and similar classifications. As the particle fractionator, it is possible to cite a hydrocyclone or centrifugal classifier using centrifugal classification, a hydroseparator or decanter using gravitational classification, etc. These can be used singly or in combination as the particle fractionator.

Figure 2:
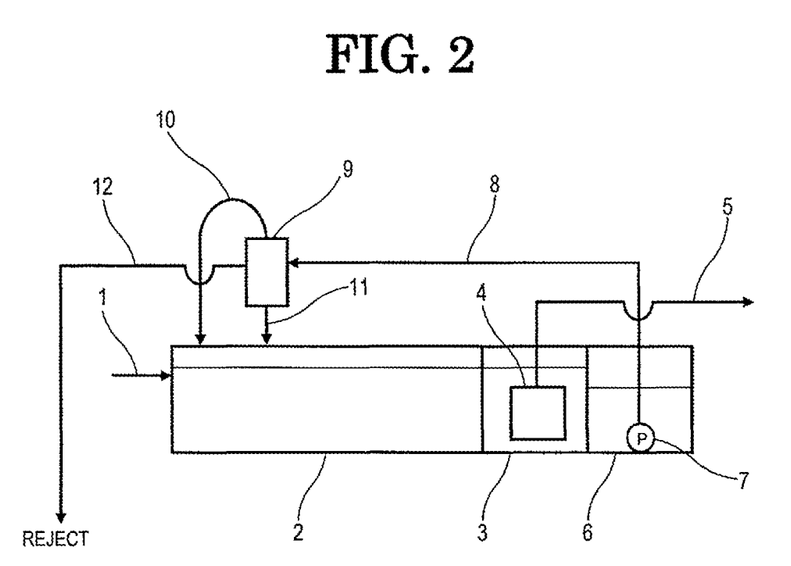
FIG. 2 is a schematic diagram for Example 2 of the present invention.

Suppression of membrane fouling can be achieved effectively by retaining larger particles with the particle fractionator. When concentration of sub-micron particles in the membrane separation tank is reduced, membrane fouling can be suppressed by avoiding sub-micron particles to enter membrane pores. Furthermore, when larger particles become predominant in the membrane separation tank, a cake layer is formed predominantly with these larger particles on the surface of membrane, and this cake layer prevents colloidal substances and smaller particles from entering into membrane pores. Thus, membrane fouling can be suppressed effectively even when colloidal substances remain in the membrane separation tank. Example 2 is a membrane separation device equipped with a particle fractionator in which particles are fractionated into three fractions instead of two fractions as is for Example 1. FIG. 2 shows an outline for Example 2. The treatment flow for Example 2 is as same as that for Example 1 except draw water is fractionated into three fractions by the particle fractionator.

Draw water 8 from recirculation tank 6 is fractionated into first fraction 10, second fraction 11 and third fraction 12 in the particle fractionator 9. Sub-micron particles are predominately contained in the third fraction 12. Larger particles are contained in the second fraction 11. The first fraction 10 is residual of the second and third fractions and it contains much less particles. The third fraction 12, in which sub-micron particles are contained, is rejected from the membrane separation device. The second fraction 11 and first fraction 10 are returned to the reaction tank 2, thus larger particles are retained in the membrane separation device.

Three-phase hydrocyclone can be used as the particle fractionator which can divide particles into three fractions. In a two-phase hydrocyclone, up flow is formed in the center and down flow is generated around the inner wall. Larger particles are fractionated into the down flow and come out from the bottom of the hydrocyclone, and residual particles are contained in the up flow and come out as over flow from the top.

In three-phase hydrocyclone, which is utilized in Example 2, piping is installed in the middle of the up flow of the hydrocyclone. Particles in middle range with size are fractionated into this piping and can be taken as the third fraction. Sub-micron particles can be fractionated into the middle flow of the three-phase hydrocyclone and rejected from the device.

By returning the second fraction containing larger particles and the first fraction as residual of the second fraction containing sub-micron particles to the membrane separation device, it is possible to make the ratio of the amount of return water to the draw water larger than that for Example 1. This results in reduction of the amount of reject and increase in the amount of product water from the membrane separation device.

Furthermore, Example 2 enables to minimize the amount of reject water even if increasing the amount of draw water from the membrane separation device to the particle fractionator. Increase in the amount of draw water from the membrane separation device results in increase in removal rate of sub-micron particles from the membrane separation device. This enables achievement of suppression of membrane fouling in a short period.

Figure 3:
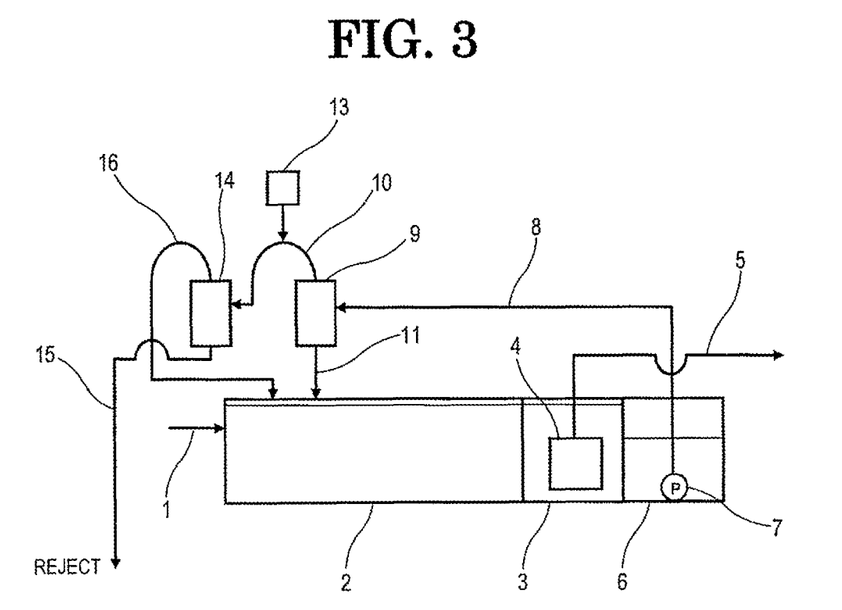
FIG. 3 is a schematic diagram for Example 3 of the present invention.

FIG. 3 shows a treatment flow for Example 3 in which the membrane separation device is equipped with two particle fractionators.

The treatment flow for Example 3 is as same as that for Example 1 except draw water is fractionated by using two particle fractionators.

Draw water 8 from recirculation tank 6 is fractionated into first fraction 10 and second fraction 11 by using the particle fractionator 9. Sub-micron particles are predominately contained in the first fraction 10 and larger particles are contained in the second fraction 11. The second fraction 11 is returned to the reaction tank 2. The first fraction 10 is further fractionated into the third fraction 15 and the fourth fraction 16. Sub-micron particles contained in the first fraction 10 are predominantly fractionated into the third fraction 15 by using the particle fractionator 14.

The residual becomes the fourth fraction 16, and the fourth fraction 16 contains almost no particles. The third fraction 15 containing sub-micron particles is rejected from the membrane separation device, and the fourth fraction 16 is returned to the reaction tank 2.

Furthermore, chemicals such as coagulant can be added to the first fraction 10 before feeding to the particle fractionator 14 as shown in the treatment flow for Example 3 in FIG. 3. Sub-micron particles in the first fraction 10 can be easily fractionated by particle fractionator 14 by adding coagulant to the first fraction 10. Coagulant, flocculent and other chemicals can be used for this purpose.

By returning the second fraction 11 containing larger particles and the fourth fraction 16 as residual of the second fraction 11 containing sub-micron particles to the membrane separation device, it is possible to make the ratio of the amount of return water to the draw water larger than that for Example 1. This results in reduction of the amount of reject and increase in the amount of product water from the membrane separation device.

Figure 4:
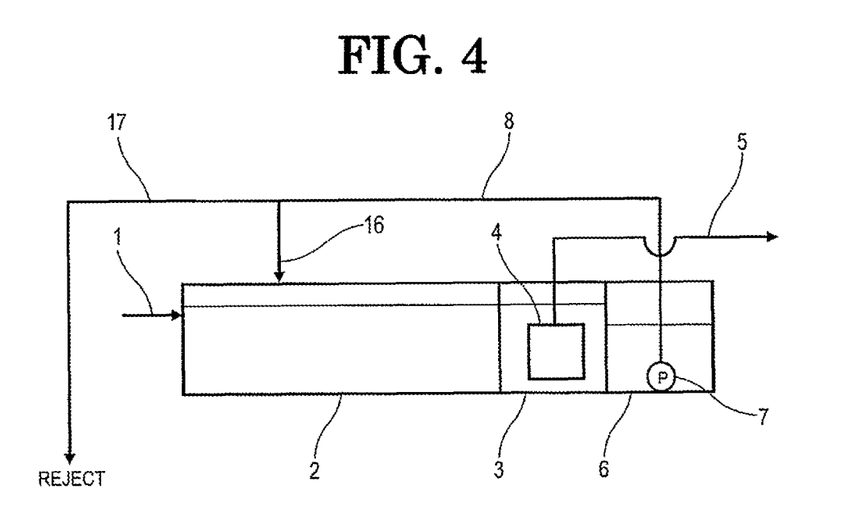
FIG. 4 is a schematic diagram for Comparative Example.

Furthermore, as same as Example 2, Example 3 enables to minimize the amount of reject water even if increasing the amount of draw water from the membrane separation device to the particle fractionator. Increase in the amount of draw water from the membrane separation device results in increase in removal rate of sub-micron particles. This enables achievement of suppression of membrane fouling in a short period. FIG. 4 shows a treatment flow for Comparative Example.

The treatment flow for Comparative Example is as same as that for

Example 1 except that draw water 8 is divided into return water 16 and reject 17 without using a particle fractionator. Particles in the draw water 8 are divided according to the ratio of the reject 17 to the return water 16. Therefore, the ratio of sub-micron particles to larger particles does not change. Thus, particle distribution in the membrane separation device does not change even by separating draw water 8 into return water 16 and reject 17.

Test data will be shown below to verify the effectiveness of the method by Example as compared with data by Comparative Example.

In Example 1, biological treatment process with activated sludge was used for the process in the reaction tank 2, and membrane filtration process with a submerged-type UF membrane was utilized in the membrane separation tank 3. A submerged-type UF membrane with nominal pore size of 0.04 μm was used. Hydrocyclone was used as a particle fractionator 9. The volumes of the reaction tank 2 and the membrane separation tank 3 were 400 m$^3$ and 50 m$^3$, respectively. Draw water 8 was taken from the membrane separation tank 3 at the average rate of 36 m$^3$/day to keep the concentration of the activated sludge in the reaction tank 2 at 2,000 mg/L. When the rate of the draw water is larger than this value, the sludge concentration will decrease which results in reduction of the biological processing capacity.

Draw water 8 was supplied to the hydrocyclone, and up flow was taken from the top of the hydrocyclone and rejected as the first fraction 10 from the device. The residual was taken from the down flow of the hydrocyclone and returned to the reaction tank 2 as the second fraction 11. It was desirable that the ratio of the amount of the first fraction 10 to the second fraction 11 is 1:4 to maintain the sludge concentration in the reaction tank 2 at a proper value. Thus, 20% of the draw water 8 was discarded from the membrane separation device, and the rate of the reject was 36 m³/day in average. The fraction containing the rejected sludge was fed to the digestion process.

Figure 5:
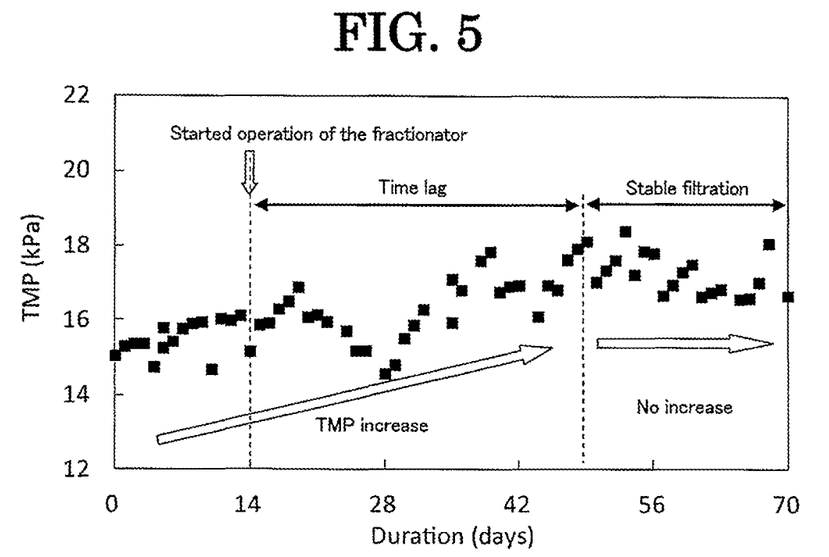
FIG. 5 is a graph showing a chronological variation in trans membrane pressure (TMP) in the membrane filtration process in Example 1.

FIG. 5 shows changes in TMP (Trans Membrane Pressure) during verification testing for Example 1. Hydrocyclone was used as a particle fractionator and was started on the 14th day. TMP was increased from beginning to 49th days, and then became almost constant after 49th days. Thus, TMP became constant after about 35 days from starting of the hydrocyclone which indicates that membrane fouling was suppressed during this period. Operating condition was not changed except starting the hydrocyclone during the test period. From these results, it was verified that membrane fouling is suppressed by using hydrocyclone.

Figure 6:
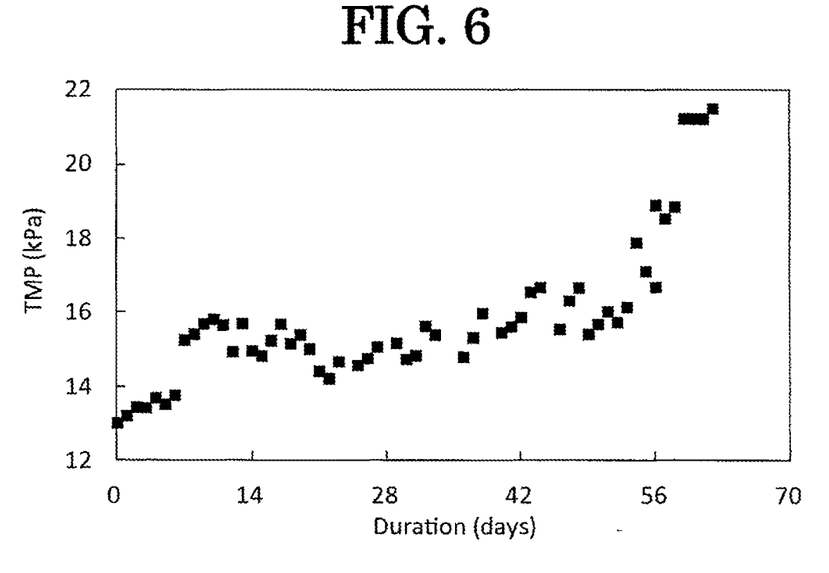
FIG. 6 is a graph showing a chronological variation in trans membrane pressure (TMP) in the membrane filtration process in Comparative Example 1.

FIG. 6 shows changes in TMP in the case of Comparative Example in which particle fractionator was not used as shown in FIG. 4. It was noticed that TMP was gradually increased from beginning to 50 days. Then, TMP increased rapidly after 50 days, which indicates that membrane fouling proceeded rapidly. It is found that TMP increased continuously and membrane fouling always proceeded during the test period in Comparative Example. It is concluded from these results that membrane fouling can be suppressed by using hydrocyclone with the membrane separation device.

Particle size distribution of particles in fractions of the hydrocyclone was measured during the verification testing in Example 1 to examine mechanism of suppression of membrane fouling by hydrocyclone. The particle size distribution measurement was conducted by using a particle size analyzer (trade name: Zetasizer Nano ZS 3600 made by Malvern Co.) through dynamic light scattering. Besides, the concentration variation of colloidal substances in the membrane separation tank during the testing was examined. The concentration of colloidal substances was determined by TOC (total organic carbon) of the colloidal substances, which is the TOC difference between the filtrate TOC of 1.5 μm filter paper and the permeate TOC of 0.04 μm membrane.

Figure 7:
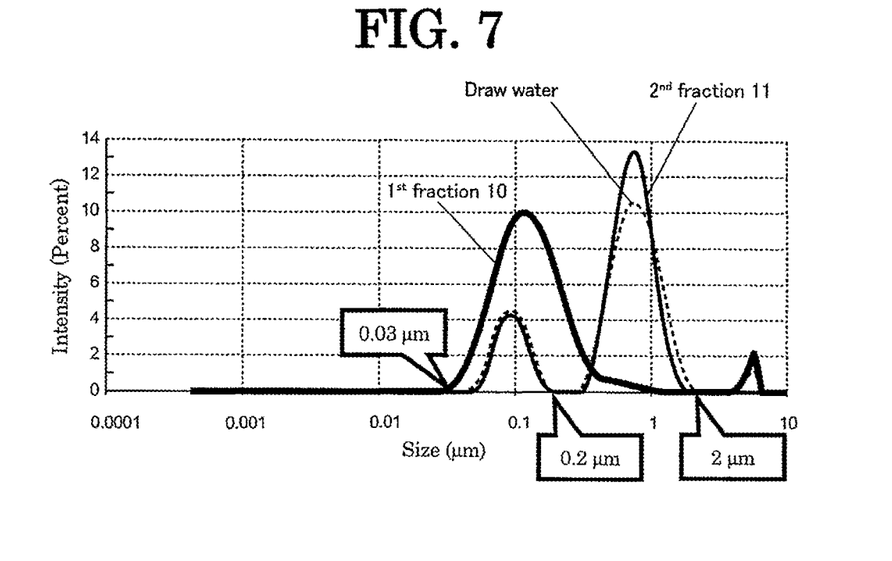
FIG. 7 is a graph showing measurement results of particle size distribution for draw water, and the first fraction 10 and the second fraction 11 of the particle fractionator in Example 1.

FIG. 7 shows the result of measurement for the particle size distribution. There were two large peaks for the draw water 8 from the recirculation tank 6. One is a group of sub-micron particles ranging from 0.03 to 0.2 μm with a peak of 0.1 μm. The other is a group of larger particles ranging from 0.3 to 2 μm with a peak of 0.9 μm. Similar peaks were observed for the second fraction 11, which is down flow of the hydrocyclone. The peak for the larger particles was higher than that for the draw water 8, which indicates that concentration of the larger particles increased in the second fraction 11 which was returned to the reaction tank.

Furthermore, in the first fraction 10 as upper flow of the hydrocyclone, large particles' peak was scarcely observed, and sub-micron particles ranged from 0.03 to 0.4 μm with a peak of 0.1 μm were dominant. It is concluded from these results that sub-micron particles are predominantly fractionated into the first fraction 10 by the hydrocyclone and those particles can selectively be removed from the membrane separation device by rejecting the first fraction 10 out of the membrane separation device.

Particle size of the rejected sub-micron particles by using the hydrocyclone was ranged from 0.03 to 0.4 μm, and this size was slightly smaller or larger than nominal pore size of 0.04 μm of the membrane pore which was used in the membrane separation device. It should be noted that the measurement value by the laser-scattering-type particle size analyzer is an approximation value as a sphere particle and the particle size is measured as being larger when binding particles, etc. exist on the surface of the particle. For these reasons, particles can be penetrated into the membrane pores even if the measured size of the particle is roughly equal or slightly larger than that of the membrane pores. It is concluded from these considerations that membrane fouling can be suppressed by fractionating sub-micron particles with the hydrocyclone and rejecting those particles from the membrane separation device.

Figure 8:
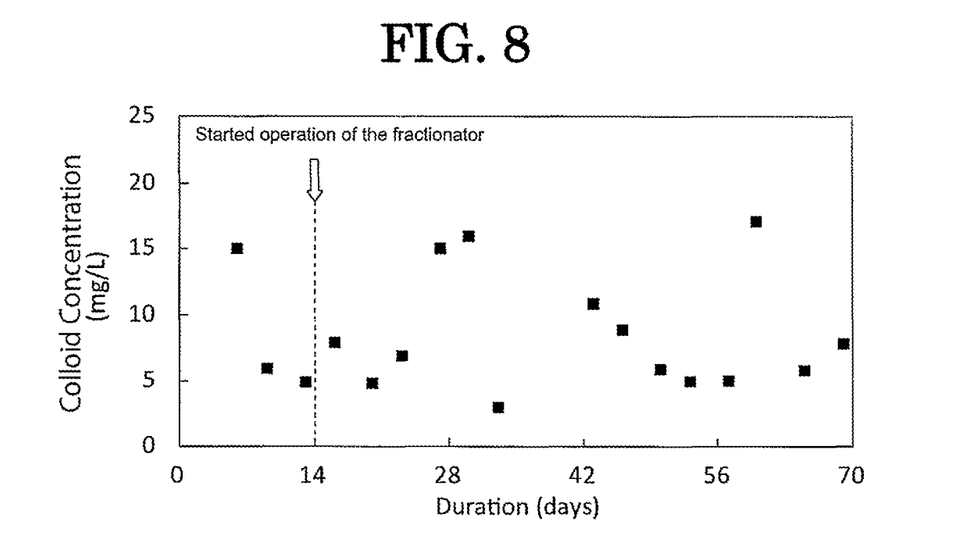
FIG. 8 is a graph showing a chronological variation in colloidal substances (total organic carbon) concentration before and after starting the particle fractionator in Example 1.

FIG. 8 shows changes in the concentration of colloidal substances in the membrane separation tank during the same period as the measurement of TMP in Example 1 which was shown in FIG. 5. It is revealed from FIG. 8 that the concentration of colloidal substances varied in a certain range in the measurement period and decrease in the concentration was not observed even after starting operation of the hydrocyclone. Colloidal substances are considered to be one of major causes of membrane fouling and it was expected that membrane fouling is suppressed by removing colloidal substances with a hydrocyclone as is described in Patent Publication 1. It was revealed, however, that the concentration of colloidal substances was actually not changed even after operating the hydrocyclone, and it was verified by the present invention that membrane fouling can be suppressed without reducing the concentration of colloidal substances in the membrane separation tank.

Mechanism for the suppression of fouling without reduction of colloidal substances is explained as follows.

Larger particles become predominant in the membrane separation tank, after removing sub-micron particles from the membrane separation device by hydrocyclone. When larger particles become predominant in the membrane separation tank, a cake layer is formed predominantly with these larger particles on the surface of membrane, and this cake layer prevents colloidal substances and smaller particles from entering into membrane pores. Thus, membrane fouling can be suppressed effectively even when colloidal substances remain in the membrane separation tank.

The increase of TMP was suppressed only after 35 days from the starting operation of the hydrocyclone as shown in FIG. 5. This time delay is attributed to that the rate of draw water from the membrane separation tank was limited and it took a long time to remove sub-micron particles from the membrane separation tank.

The total volume of the reaction tank and the membrane separation tank was 450 m³, and the rate of the reject fractionated by the hydrocyclone was 36 m³/day on average, as described above. Expected time for removal of the sub-micron particles was 38 days, which was calculated by diving the total volume by the rate of the reject, and then multiply by three (so-called 3 HRT, hydraulic retention time). It results in a calculation that rejecting the amount of treated water in the membrane separation device requires 38 days. The suppression of the fouling was achieved after 35 days from operation of the hydrocyclone, and this duration almost corresponded with the expected days.

Example 2 and Example 3 were invented to shorten the time lag for suppression of membrane fouling in Example 1. In Example 2, for example, by returning the second fraction containing larger particles and the first fraction as residual of the second fraction containing sub-micron particles to the membrane separation device, the ratio of the amount of return water to the membrane separation device to the draw water from the membrane separation device becomes larger than that of Example 1. This results in reduction of the amount of reject to be rejected to the outside of the system and increase in the amount of product water from the membrane separation device. Furthermore, Example 2 enables to minimize the amount of reject water, even if increasing the amount of draw water from membrane separation device to the particle fractionator. Increase in the amount of draw water from the membrane separation device results in increase in removal rate of sub-micron particles from the membrane separation device. This enables achievement of suppression of membrane fouling in a short period of time.

The invention claimed is:

1. An apparatus for water treatment, comprising:
a membrane separator for solid-liquid separation;
a first hydrocyclone which has upper and lower exits to obtain a first overflow and a first underflow, respectively; and
a second hydrocyclone which has upper and lower exits to obtain a second overflow and a second underflow, respectively,
wherein the first hydrocyclone is configured to receive a liquor containing particles of different sizes including submicron particles having a particle size range of 0.03 to 0.4 μm before a membrane separation by the membrane separator,
wherein the lower exit of the first hydrocyclone is connected to the membrane separator, such that the first underflow is supplied to the membrane separator,
wherein the first hydrocyclone is configured to selectively fractionate the submicron particles into the first overflow, such that the first underflow becomes less than the liquor in terms of content of the submicron particles,
wherein the second hydrocyclone is configured to receive the first overflow of the first hydrocyclone,
wherein the upper exit of the second hydrocyclone is connected to the membrane separator such that the second overflow is supplied to the membrane separator, and
wherein the second hydrocyclone is configured to selectively fractionate the submicron particles contained in the first overflow into the second underflow which is rejected from the membrane separator, such that the second overflow becomes less than the first overflow in terms of content of the submicron particles.

2. An apparatus for water treatment, comprising:
a membrane separator for solid-liquid separation;
a reactor for pretreatment before a membrane separation by the membrane separator;
a first hydrocyclone which has upper and lower exits to obtain a first overflow and a first underflow, respectively; and
a second hydrocyclone which has upper and lower exits to obtain a second overflow and a second underflow, respectively,
wherein the first hydrocyclone is configured to receive a liquor containing particles of different sizes including submicron particles having a particle size range of 0.03 to 0.4 μm before the membrane separation by the membrane separator,
wherein the lower exit of the first hydrocyclone is connected to the membrane separator or the reactor for pretreatment, such that the first underflow is supplied to the membrane separator or the reactor for pretreatment,
wherein the first hydrocyclone is configured to selectively fractionate the submicron particles into the first overflow, such that the first underflow becomes less than the liquor in terms of content of the submicron particles,
wherein the second hydrocyclone is configured to receive the first overflow of the first hydrocyclone,
wherein the upper exit of the second hydrocyclone is connected to the membrane separator or the reactor for pretreatment such that the second overflow is supplied to the membrane separator or the reactor for pretreatment, and
wherein the second hydrocyclone is configured to selectively fractionate the submicron particles contained in the first overflow into the second underflow which is rejected from the membrane separator and the reactor for pretreatment, such that the second overflow becomes less than the first overflow in terms of content of the submicron particles.

3. The water treatment apparatus of claim 2, wherein the reactor for pretreatment before the membrane separation includes a biological treatment process.

4. The water treatment apparatus of claim 2, wherein the reactor for pretreatment before the membrane separation includes a physical-chemical treatment process.

5. A method for water treatment, comprising the steps of:
a membrane separation step for solid-liquid separation using a membrane separator; and
a fractionation step by using a hydrocyclone which has upper and lower exits to obtain an overflow and an underflow, respectively,
wherein a liquor containing particles of different sizes including submicron particles having a particle size range of 0.03 to 0.4 μm is fed to the hydrocyclone to conduct the fractionation step before the membrane separation step by a membrane in the membrane separator,
wherein the fractionation step is conducted by using the hydrocyclone such that the submicron particles are selectively fractionated into the overflow, and
wherein the overflow is rejected from the membrane separation step, and the underflow is supplied to the membrane separator, the underflow being less than the liquor in terms of content of the submicron particles.

6. A method for water treatment, comprising the steps of:
a membrane separation step for solid-liquid separation using a membrane separator;
a first fractionation step by using a first hydrocyclone which has upper and lower exits to obtain a first overflow and a first underflow, respectively; and
a second fractionation step by using a second hydrocyclone which has upper and lower exits to obtain a second overflow and a second underflow, respectively,
wherein a liquor containing particles of different sizes including submicron particles having a particle size range of 0.03 to 0.4 μm is fed to the first hydrocyclone to conduct the first fractionation step before the membrane separation step,
wherein the first fractionation step is conducted by using the first hydrocyclone such that the submicron particles are selectively fractioned into the first overflow,
wherein the first underflow is supplied to the membrane separation step, the first underflow being less than the liquor in terms of content of the submicron particles,
wherein the first overflow of the first hydrocyclone is fed to the second hydrocyclone to conduct the second fractionation step,
wherein the second fractionation step is conducted by using the second hydrocyclone such that the submicron particles are selectively fractioned into the second underflow, and
wherein the second underflow is rejected from the membrane separation step, and the second overflow of the second hydrocyclone is supplied to the membrane separation step, the second overflow being less than the first overflow in terms of content of the submicron particles.

7. A method for water treatment, comprising the steps of:
a membrane separation step for solid-liquid separation using a membrane separator;
a pretreatment step before the membrane separation step; and
a fractionation step by using a hydrocyclone which has upper and lower exits to obtain an overflow and an underflow, respectively,
wherein a liquor containing particles of different sizes including submicron particles having a particle size range of 0.03 to 0.4 µm is fed to the hydrocyclone to conduct the fractionation step before the membrane separation step,
wherein the fractionation step is conducted by using the hydrocyclone such that the submicron particles are selectively fractioned into the overflow, and
wherein the overflow is rejected from the membrane separation step and the pretreatment step, and the underflow is supplied to the membrane separation step or the pretreatment step, the underflow being less than the liquor in terms of content of the submicron particles.

8. The water treatment method of claim 7, wherein the pretreatment step before the membrane separation step includes a biological treatment process.

9. The water treatment method of claim 7, wherein the pretreatment step before the membrane separation step includes a physical-chemical treatment process.

10. A method for water treatment, comprising the steps of:
a membrane separation step for solid-liquid separation,
a pretreatment step before the membrane separation step,
a first fractionation step by using a first hydrocyclone which has upper and lower exits to obtain a first overflow and a first underflow, and
a second fractionation step by using a second hydrocyclone which has upper and lower exits to obtain a second overflow and a second underflow,
wherein a liquor containing particles of different sizes including submicron particles having a particle size range of 0.03 to 0.4 µm is fed to the first hydrocyclone to conduct the first fractionation step before the membrane separation step,
wherein the first fractionation step is conducted by using the first hydrocyclone such that the submicron particles are selectively fractioned into the first overflow,
wherein the first underflow is supplied to the membrane separation step or the pretreatment step, the first underflow being less than the liquor in terms of content of the submicron particles,
wherein the first overflow of the first hydrocyclone is fed to the second hydrocyclone to conduct the second fractionation,
wherein the second fractionation step is conducted by using the second hydrocyclone such that the submicron particles are selectively fractioned into the second underflow,
wherein the second underflow is rejected from the membrane separation step and the pretreatment step, and the second overflow is supplied to the membrane separation step or the pretreatment step, the second overflow being less than the first overflow in terms of content of the submicron particles.

11. The water treatment method of claim 10, wherein the pretreatment step before the membrane separation step includes a biological treatment process.

12. The water treatment method of claim 10, wherein the pretreatment step before the membrane separation step includes a physical-chemical treatment process.

* * * * *